(12) United States Patent
Song et al.

(10) Patent No.: US 11,966,143 B2
(45) Date of Patent: Apr. 23, 2024

(54) LIGHT SHUTTER PANEL AND TRANSPARENT DISPLAY APPARATUS HAVING THE SAME

(71) Applicant: LG Display Co., Ltd., Seoul (KR)

(72) Inventors: Youngki Song, Paju-si (KR); SunMan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 360 days.

(21) Appl. No.: 17/236,788

(22) Filed: Apr. 21, 2021

(65) Prior Publication Data

US 2021/0382366 A1 Dec. 9, 2021

(30) Foreign Application Priority Data

Jun. 8, 2020 (KR) .......................... 10-2020-0069130

(51) Int. Cl.
*G02F 1/167* (2019.01)
*G02F 1/1676* (2019.01)
*G02F 1/1679* (2019.01)

(52) U.S. Cl.
CPC ............ *G02F 1/167* (2013.01); *G02F 1/1676* (2019.01); *G02F 1/1679* (2019.01); *G02F 2203/01* (2013.01)

(58) Field of Classification Search
CPC ....... G02F 1/167; G02F 1/1679; G02F 1/1676
See application file for complete search history.

(56) References Cited

U.S. PATENT DOCUMENTS

2012/0113499 A1* 5/2012 Komatsu ............... G02F 1/1677
359/296
2020/0292488 A1* 9/2020 Lim ........................ G02F 1/167

* cited by examiner

*Primary Examiner* — Lucy P Chien
(74) *Attorney, Agent, or Firm* — Fenwick & West LLP

(57) ABSTRACT

The present disclosure relates to a light shutter panel and a transparent display apparatus having the same. The light shutter panel according to the present disclosure comprises: a lower electrode plate; an upper electrode plate facing with the lower electrode plate; a shutter layer disposed between the lower electrode plate and the upper electrode plate, and including a maximum light transmitting portion, a minimum light blocking portion, ink storage portions connecting the maximum light transmitting portion and the minimum light blocking portion, and an electric field guide disposed between the ink storage portions; a plurality of spacers maintaining a gap between the lower electrode plate and the upper electrode plate; and black ink filled into the ink storage portion of the shutter layer.

20 Claims, 14 Drawing Sheets

LIGHT SHUTTER PANEL AND TRANSPARENT DISPLAY APPARATUS HAVING THE SAME

CROSS-REFERENCE TO RELATED APPLICATIONS

This application claims the benefit of the Korean Patent Application No. 10-2020-0069130 filed on Jun. 8, 2020, which is hereby incorporated by reference as if fully set forth herein.

BACKGROUND

Field of the Invention

The present disclosure relates to a light shutter panel and a transparent display apparatus having the same. Especially, the present disclosure relates to a light shutter panel selectively blocking or transpassing the light incident from the back side of the panel, and a transparent display apparatus with the same light shutter panel to selectively block or transpass the background scene of the display device.

Discussion of the Related Art

Devices or apparatuses for displaying images have been developed in various forms such as CRT (Cathode Ray Tube), LCD (Liquid Crystal Display), PDP (Plasma Display Panel), and electroluminescent display. In particular, the electroluminescent display may include a self-luminous display or a curved self-luminous display. For example, the display may include a light emitting display panel, a micro LED display panel, a flexible light emitting display panel, a flexible micro LED display panel, or a quantum dot light emitting display panel, but it is not limited thereto.

The main purpose of the display apparatus is for providing the video information. In some cases, it may be required to provide the video information with the background scene shown through the display device. To do so, the transparent display apparatus had been suggested for providing the video information from the display device with the background scene passing through the display apparatus, at the same time.

Since the transparent display apparatus according to the related art provides a background scene, the background scene often hinders an observer's proper recognition of the video information provided from the display itself. The transparent display apparatus may provide an optimal function according to a usage environment. On the contrary, a function of providing video information, which is the main purpose of the display apparatus, may be rather degraded.

SUMMARY

The purpose of the present disclosure, as for solving the problems described above, is to provide a multi-purpose display in which, in accordance of user's selection, the display may be used as a transparent display apparatus for providing the video information with the background scene, or the display may be used as a display apparatus for providing the video information only by disabling the transparent function. Another purpose of the present disclosure is to provide a transparent display apparatus including a light shutter panel having a light blocking function and a light transparenting function, and a transparent display panel disposed in front of the light shutter panel for providing video information with the background scene selectively passing the light shutter panel. Still another purpose of the present disclosure is to provide a light shutter panel having a light blocking mode and a light transparenting mode, wherein, for the light transparenting mode, a light transmittance ratio of the light shutter panel is at least 70% of total light intensity provided from the backside of the light shutter panel, and to provide a transparent display apparatus having the same light shutter panel. Yet another purpose of the present disclosure is to provide a transparent display apparatus in which, distortion of the video information due to the background light intensity may be prevented by completely blocking the light provided from the backside of the light shutter panel, for the light transparenting mode.

In order to accomplish the above mentioned purposes of the present disclosure, a light shutter panel according to the present disclosure comprises: a lower electrode plate; an upper electrode plate facing with the lower electrode plate; a shutter layer disposed between the lower electrode plate and the upper electrode plate, and including maximum light transmitting portion, a minimum light blocking portion, ink storage portions connecting the maximum light transmitting portion and the minimum light blocking portion, and an electric field guide disposed between the ink storage portions; a plurality of spacers maintaining a gap between the lower electrode plate and the upper electrode plate; and black ink filled into the ink storage portion of the shutter layer.

In one embodiment, the lower electrode plate includes: a lower transparent substrate; and a lower transparent electrode layer disposed on an entire upper surface of the lower transparent substrate. The upper electrode plate includes: an upper transparent substrate; and an upper transparent electrode layer disposed on the entire upper surface of the upper transparent substrate. The lower electrode plate and the upper electrode plate are joined with each other to face the lower transparent electrode layer and the upper transparent electrode layer.

In one embodiment, the ink storage portion has a profile in which a cross sectional shape of the ink storage portion extends from the minimum light blocking portion to the maximum light transmitting portion, and a cross sectional area the ink storage portion increases gradually. The electric field guide extends from the maximum light transmitting portion to the minimum light blocking portion, and a cross sectional area of the electric field guide decreases gradually.

In one embodiment, an area of the minimum light blocking portion is at most 30% of an area of the maximum light transmitting portion.

In one embodiment, a height of the electric field guide is in a range of 50% to 90% of a height of the spacer.

In one embodiment, the black ink includes: a transparent fluid; and a plurality of charge black particles evenly dispersed into the transparent fluid.

In one embodiment, a center point of the minimum light blocking portion is arranged to coincide with a center point of the maximum light transmitting portion.

In one embodiment, a center point of the minimum light blocking portion is arranged to shift to one side of the maximum light transmitting portion.

Further, a transparent display apparatus according to the present disclosure comprises: a transparent display panel including a plurality of pixels in a matrix, each of the pixels including an emission area and a transmission area; and a light shutter panel including: a lower electrode plate; an upper electrode plate facing the lower electrode plate; a shutter layer disposed between the lower electrode plate and the upper electrode plate, and including a maximum light transmitting portion, a minimum light blocking portion, ink storage portions connecting the maximum light transmitting portion and the minimum light blocking portion, and an electric field guide disposed between the ink storage portions; a plurality of spacers maintaining a gap between the lower electrode plate and the upper electrode plate; and black ink filled into the ink storage portion of the shutter layer.

In one embodiment, the maximum light transmitting portion of the light shutter panel is arranged to correspond to at least one of pixels of the transparent display panel.

In one embodiment, the minimum light blocking portion of the light shutter panel is arranged to correspond to the emission area of the pixel corresponding to the maximum light transmitting portion.

In one embodiment, the spacers of the light shutter panel are arranged as corresponding to areas except the transmission area of the transparent display panel.

In one embodiment, the spacers are arrayed to overlap with the minimum light blocking portion with a predetermined distance.

In one embodiment, the spacers are arrayed on the electric field guide with a predetermined distance.

A light shutter panel according to the present disclosure comprises an upper electrode layer, a lower electrode layer, an electric field guide having a minimum light blocking portion and a maximum light transpassing portion, an ink storing portion and charged black ink filled in the ink storing portion. When driving the charge black ink by applying an electric field between the upper electrode layer and the lower electrode layer, an electric field may be provided without any distorted portion by the shape of the electric field guide. In the transparent mode, the charged black ink may be gathered within the minimum light blocking portion, so that there is no degradation of transmittance caused by the charged black ink that is not concentrated within a predetermined area (i.e., the minimum light blocking portion) due to the electric field distortion. Further, by setting the cross-sectional area of the minimum light blocking portion to less than 30% of the maximum light transpassing portion, the transmittance ratio may be guaranteed to 70% or more.

In addition, the light shutter panel according to the present disclosure may be configured such that two of the unit light shutter panels have the same structure. For example, two of the unit light shutter panels are joined by arranging the minimum light blocking portions to overlap each other, and the light shutter panel may have high transmittance ratio without any reduction of minimum light transmittance ratio (70%) of the unit light shutter panel. When transparent spacers are applied into the light shutter panel in order to ensure the high ratio of the light transmittance, in the light blocking mode, the light leakage may be occurred by the scattering phenomena as the lights are passing the transparent spacers. However, the light shutter panel according to the present disclosure may ensure the maximum light blocking ratio by joining two of the unit light shutter panels arranged such that the transparent spacers of the two unit light shutter panels are not overlapped with each other.

Consequently, a transparent display apparatus according to the present disclosure may provide the background scene with sufficient brightness in the transparent mode, and may provide the video information only without any distortions by fully blocking the lights from the background scene.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
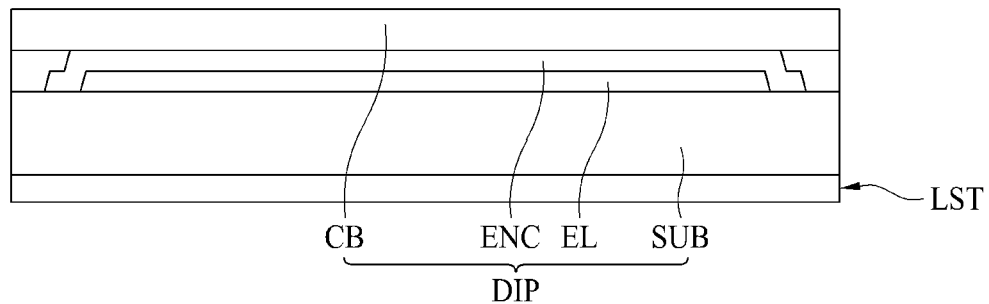
FIG. 1 is a cross sectional view illustrating a transparent display apparatus according to the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part may also be present unless "only" is used. The terms in a singular form may include plural forms unless noted to the contrary.

In construing an element, the element is construed as including an error range although there is no explicit description.

In describing a positional relationship, for example, when the positional order is described as "on," "above," "below," and "next," the case of no contact there-between may be included, unless "just" or "direct" is used. If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as the first, the second, A, B, (a) and (b) may be used. These terms are only to distinguish the elements from other elements, and the terms are not limited in nature, order, sequence or number of the elements. When an element is described as being "linked", "coupled" or "connected" to another element that element may be directly connected to or connected to that other element, but indirectly unless otherwise specified. It is to be understood that other elements may be "interposed" between each element that may be connected to or coupled to.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

Hereinafter, an example of a display apparatus according to the present disclosure will be described in detail with reference to the accompanying drawings. In designating reference numerals to elements of each drawing, the same components may have the same reference numerals as much as possible even though they are shown in different drawings. Scale of the elements shown in the accompanying drawings have a different scale from the actual for convenience of description, it is not limited to the scale shown in the drawings.

Figure 2:
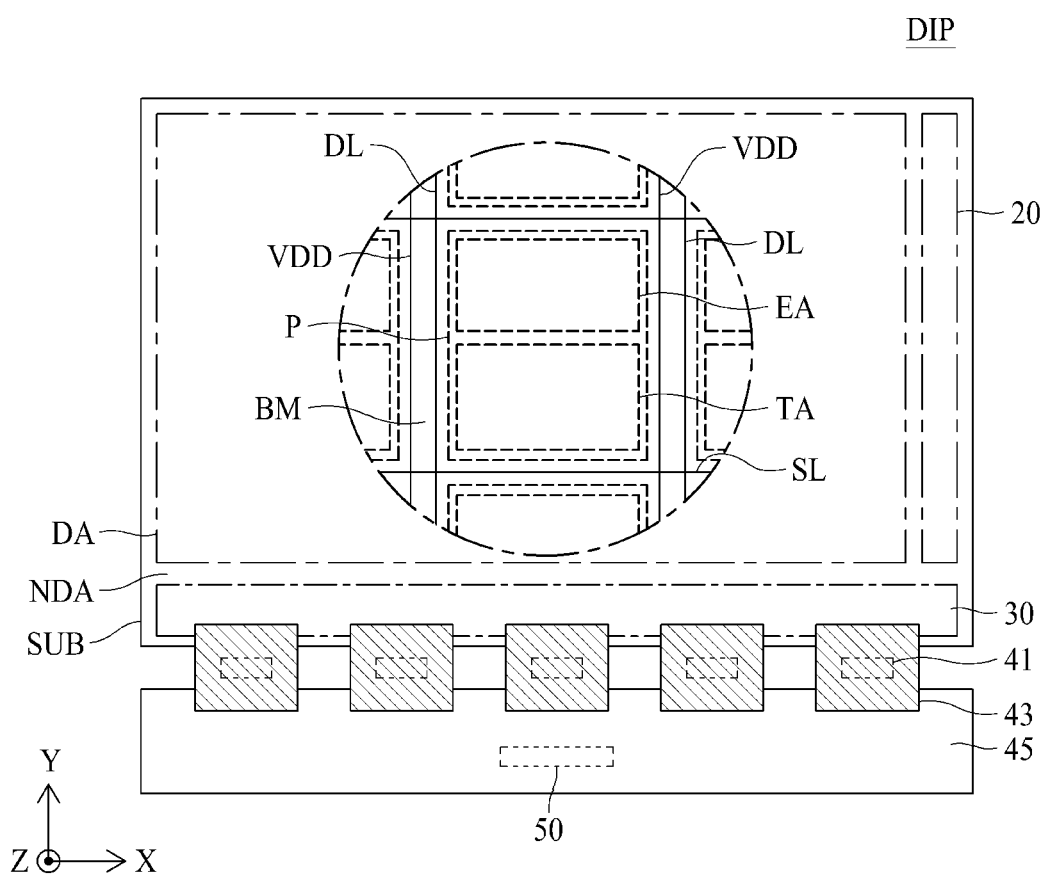
FIG. 2 is a plane view illustrating a transparent display panel of the transparent display apparatus according to one embodiment of the present disclosure.

Hereinafter, referring to FIGS. 1 and 2, a transparent display apparatus according to the present disclosure will be explained. FIG. 1 is a cross sectional view illustrating a transparent display apparatus according to the present disclosure. FIG. 2 is a plane view illustrating a transparent display panel of the transparent display apparatus according to one embodiment of the present disclosure.

Referring to FIG. 1, a transparent display apparatus according to the present disclosure comprises a transparent display panel DIP and a light shutter panel LST. The light shutter panel LST may be attached to the rear surface of the transparent display panel DIP. The light shutter panel LST may be an optical panel which is selectively operated in a light transmitting mode for transpassing the light through the optical panel or in a light blocking mode for blocking the light from passing the optical panel. For example, in the light transmitting mode, the light incident from the rear side is transmitted almost through the optical panel, so the background scene may be acknowledged from the front side of the optical panel, as it may be a glass. On the contrary, in the light blocking mode, almost of all light incident from the rear side into the optical panel is blocked, so the background scene may be invisible on the front side of the optical panel, as if it was covered with blinds or a curtain.

The transparent display panel DIP may include a transparent substrate SUB, a display layer EL formed on the transparent substrate SUB, an encapsulation layer ENC covering the display layer EL, and a cover plate CB disposed on the encapsulation layer ENC.

The transparent display panel DIP may be any one selected from a liquid crystal display panel, a plasma display panel, and an electroluminescent display panel. For the case that the electroluminescent display panel is used, the transparent display panel DIP may include a self-luminescent display panel or a curved self-luminescent display panel. In detail, the transparent display panel DIP may include a light emitting display panel, a micro light emitting display panel, a flexible light emitting display panel, a flexible micro light emitting display panel, or a quantum dot display panel.

The transparent substrate SUB of the transparent display panel DIP may be made of a transparent material. The display layer EL may include a plurality of pixel areas (or pixels) P arrayed in a matrix manner Each pixel area P may include a driving element (not shown) and a light emitting element (not shown). The driving element may include thin film transistors and a storage capacitor. The light emitting element may be an electroluminescent element of which luminescent may be controlled by the driving element. The electroluminescent element may include an organic light emitting diode or an inorganic light emitting diode.

The encapsulation layer ENC may protect the display layer EL and prevents gases or foreign materials from intruding from the outside. The encapsulation layer ENC may have a structure in which an inorganic layer and an organic layer are alternately stacked. It is preferable that the encapsulation layer ENC is formed of a transparent material.

The cover plate CB may be a plate or substrate having a high strength and transparent property such as a glass or plastic. For example, the cover plate CB may be a transparent protective plate for preventing the encapsulation layer ENC and display layer EL from being damaged from external impacts.

Hereinafter, referring to FIG. 2, a plane structure of the transparent display panel DIP will be explained. The transparent display panel DIP may include a transparent substrate SUB, a gate (or scan) driver 20, a data pad portion 30, a source driving integrated circuit 41, a flexible wiring film 43, a circuit board 45 and a timing controller 50.

The transparent substrate SUB main includes a display area DA and a non-display area NDA. The display area DA is for representing video information, and may be defined in most of the middle portion of the transparent substrate SUB, but it is not limited thereto. The display area DA may include a plurality of pixel areas P arrayed in a matrix manner Each of the pixel areas P may have a rectangular shape surrounded by a scan line (or gate line) SL, a data line DL and a driving current line VDD. Even though it is not shown in FIG. 2, each pixel area P may include a switching thin film transistor, a driving thin film transistor, a storage capacitor and an organic light emitting diode.

The transparent substrate SUB may include a plurality of pixels P arrayed in a matrix manner Each pixel P may have an emission area EA and a transmission area TA. Each pixel P may further include a non-emission area BM. For example, the non-emission area BM may be disposed between two pixels P. For example, a black matrix (non-emission area) BM having a predetermined width may be disposed between two neighboring pixels P. That is, a plurality of pixels P are arrayed in a matrix matter, a non-emission area BM having a mesh shaped black matrix is disposed between pixels P. In some cases, the area excepting the non-emission area BM may be defined as the pixel P.

A pixel P, in the area excepting the transmission area TA, may include an organic light emitting diode, a switching thin film transistor, a driving thin film transistor, a storage capacitor, a scan line SL, a data line DL and a driving current line VDD. For example, the scan line SL, the data line DL and the driving current line VDD for defining the pixel area P may be disposed at the non-emission area BM. The switching thin film transistor, the driving thin film transistor, the storage capacitor and the organic light emitting diode may be disposed in the emission area EA. For another example, the scan line SL, the data line DL, the driving current line VDD and the switching thin film transistor may be disposed at the non-emission area BM, and the driving thin film transistor, the storage capacitor and the organic light emitting diode may be disposed in the emission area EA.

An emission area EA may represent one color light. For an example, any one-color light of red, green and blue may be generated from one emission area EA. Three pixels P, each pixel having an emission area EA representing one-color light and a transmission area TA, may be gathered or grouped to form one unit pixel. Even though it is not shown in the figures, for another example, an emission area EA may include any one-color light selected from red, green, blue and white color lights. In this case, four pixels P representing 4 different color light in each pixel may be grouped to form one unit pixel.

The non-display area NDA is an area in which the video information is not displayed, and may be defined at the circumference area of the transparent substrate SUB as surrounding all or some portions of the (DA). The non-display area NDA may include the gate driver 20 and the data pad portion 30.

The gate driver 20 may supply the scan (or gate) signal to the scan lines in accordance with the gate control signal received from the timing controller 50. The gate driver 20 may be formed in the non-display area NDA disposed at one side of the display area DA on the transparent substrate SUB with the GIP (Gate driver In Panel) type. The GIP type may refer to a structure in which a gate driver 20 including thin film transistors and capacitors is directly formed on the transparent substrate SUB.

The data pad portion 30 may supply the data signals to the data lines DL in accordance with the data control signal received from the timing controller 50. The data pad portion 30 may be formed as a chip type and mounted on the flexible wiring film 43. The flexible wiring film 43 may be attached at the non-display area NDA disposed at one outside of the display area DA of the transparent substrate SUB by the TAB (Tape Automated Bonding) method.

The source driving integrated circuit 41 may receive the digital video data and the source control signals from the timing controller 50. The source driving integrated circuit 41 may convert the digital video data into the analog data voltages in accordance with the source control signal, and supply the analog data voltages to the data lines DL. When the source driving integrated circuit 41 is formed as a chip type, it may be mounted on the flexible wiring film 43 by the COF (Chip On Film) method or COP (Chip On Plastic) method.

The flexible wiring film 43 may include wirings for connecting the data pad portion 30 to the source driving integrated circuit 41, and for connecting the data pad portion 30 to the circuit board 45. The flexible wiring film 43 may be mounted on the data pad portion 30 using an anisotropic conducting film, so the data pad portion 30 may be connected to the wirings of the flexible wiring film 43.

The circuit board 45 may be attached to the plurality of flexible wiring films 43. The circuit board 45 may have a plurality of circuits represented in the driving chip type. For example, the timing controller 50 may be mounted on the circuit board 45. The circuit board 45 may be a printed circuit board or a flexible printed circuit board.

The timing controller 50 may receive the digital video data and the timing signals from an external system board through a cable connected to the circuit board 45. The timing controller 50 may generate the gate control signals for controlling the operation timing of the gate driver 20 and the source control signals for controlling the source driving integrated circuit 41, based on the timing signals. The timing controller 50 may supply the gate control signals to the gate driver 20, and supply the source control signal to the source driving integrated circuit 41. In some cases, the timing controller 50 may be manufactured in one driving chip as including the source driving integrated circuit 41 and then mounted on the transparent substrate SUB.

The timing controller 50 may be connected to the light shutter panel LST. According to the input of the user and in conjunction with the operation of the transparent display panel DIP, the light shutter panel LST may be operated in the light transmitting mode or in the light blocking mode. In one example, even though it is not shown in the figure, the timing controller 50 may be connected to the voltage supplier configured to supply the electric driving voltage in accordance with the operation mode of the light shutter panel LST.

The transparent display panel DIP may include an emission area EA providing the video information and a transmission area TA passing through the background scene of the display panel as it is. The arrangement of the emission area EA and the transmission area TA may be variously configured on the transparent substrate SUB.

Figure 3A:
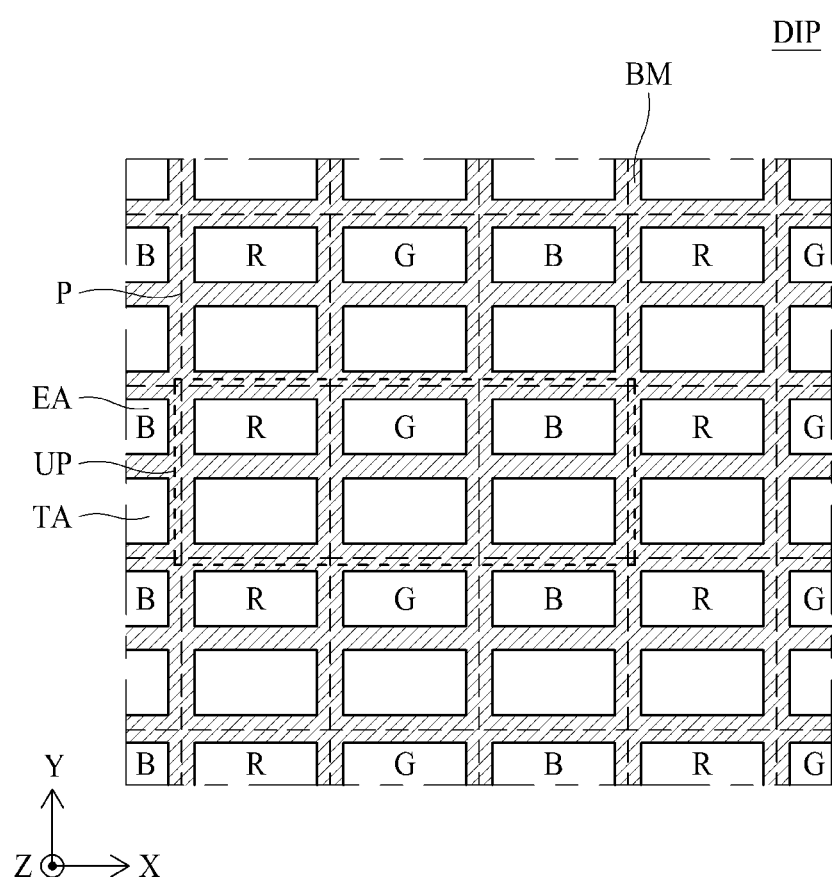
FIGS. 3A, 3B, and 3C are plane views illustrating various pixel structures of the transparent display apparatus according to the present disclosure.
Figure 3B:
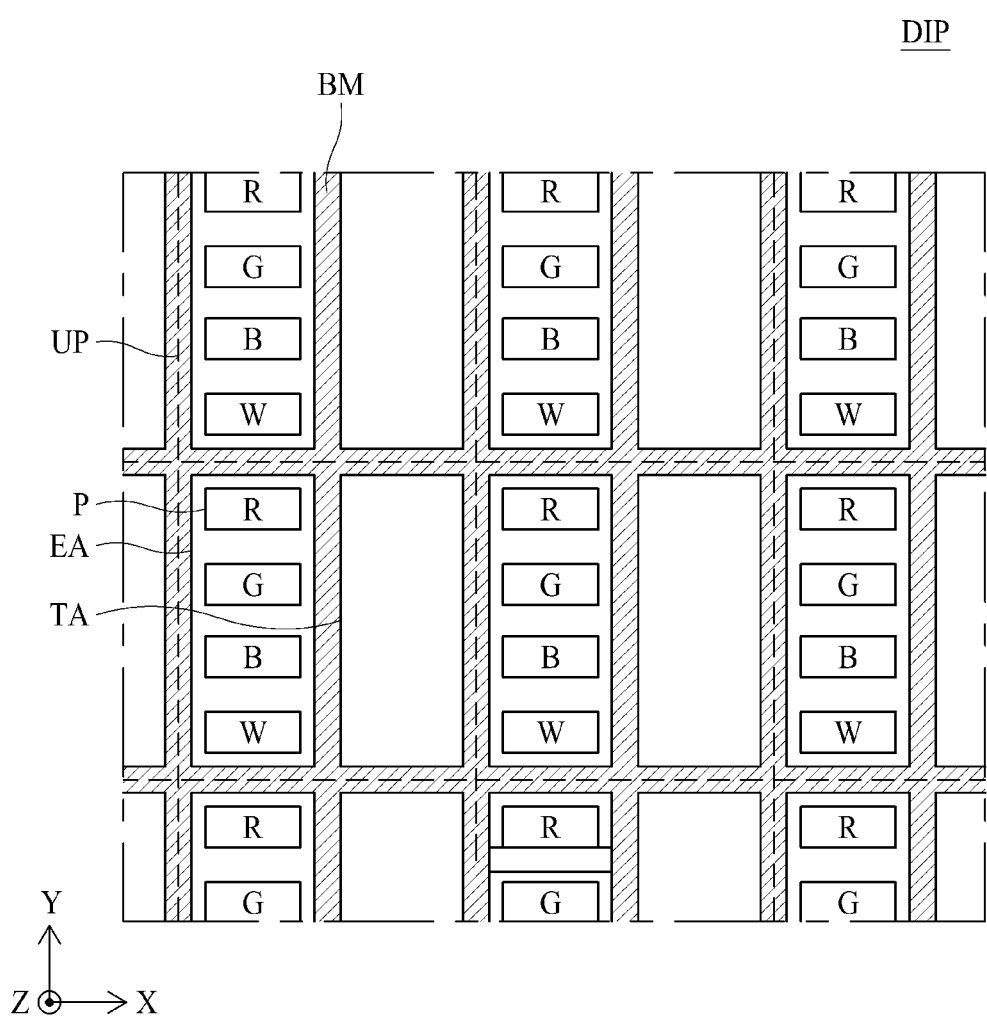
Figure 3C:
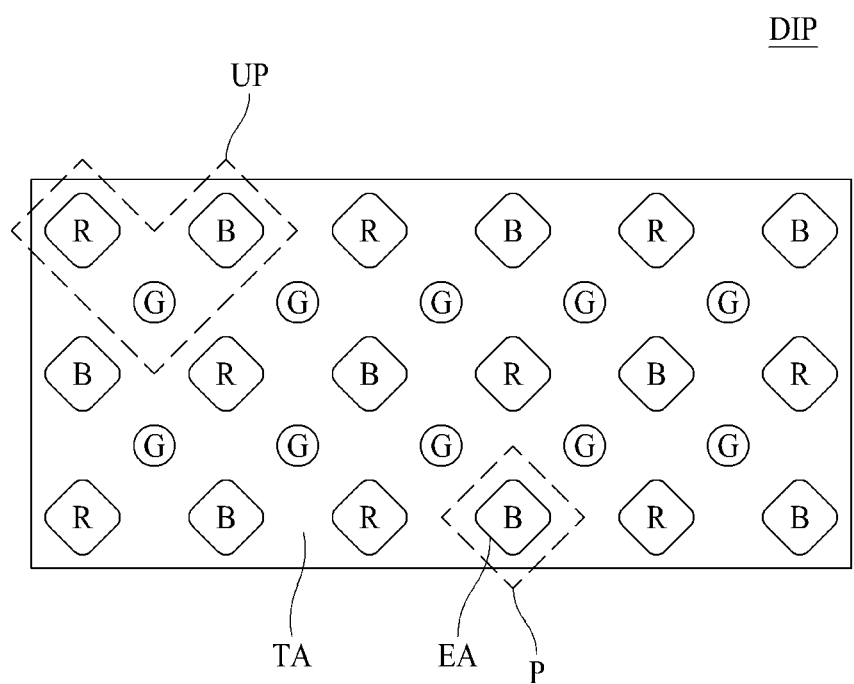

Hereinafter, referring to FIGS. 3A, 3B, and 3C, various embodiments for the emission area EA, transmission area TA and non-emission area BM in the transparent display panel DIP will be explained. FIGS. 3A, 3B, and 3C are plane views illustrating various pixel structures of the transparent display apparatus according to the present disclosure.

In one example, as shown in FIG. 3A, a plurality of pixels P may be disposed in a matrix manner A pixel P may include an emission area EA and a transmission area TA. A non-emission area BM may be disposed as surrounding the emission area EA and the transmission area TA, so the non-emission area BM may have the mesh shape over the whole surface of the transparent substrate SUB.

Each emission area EA included in the three pixels P arrayed in series may be allocated with any one of a red light emitting element R, a green light emitting element G and a blue light emitting element B. These three pixels P are grouped with each other to form a unit pixel UP. FIG. 3A shows the case in which a red light emitting element R, a green light emitting element G and a blue light emitting element B are allocated at the three consecutive pixels P along the horizontal direction (X-axis). In this case, along the vertical direction (Y-axis), the same color pixels are disposed. The transmission area TA may have a horizontal striped shape along the X-axis, and arrayed along the vertical direction (Y-axis).

In another example, as shown in FIG. 3B, a plurality of unit pixels UP is arrayed in a matrix manner. In a unit pixel UP, an emission area EA and a transmission area TA may be defined. Further, a non-emission area BM may be disposed as surrounding the emission area EA and the transmission area TA.

In the emission area EA of any one of unit pixel UP, four pixels P may be disposed. These four pixels P are successively arrayed along the vertical direction (Y-axis) in one-unit pixel UP. In one example, four pixels P may be allocated as being arrayed with a red light emitting element R, a green light emitting element G, a blue light emitting element B and a white light emitting element W. In another example, the non-emission area BM may be further included between the pixels P.

In this case, the emission area EA may have a vertical striped shape along the vertical direction (Y-axis) and be arrayed along the horizontal direction (X-axis). Further, the transmission area TA may have a vertical striped shape along the vertical direction (Y-axis) and be arrayed along the horizontal direction (X-axis).

In still another example, as shown in FIG. 3C, a plurality of emission areas EA is disposed in a pentile manner. In this case, the emission areas EA may have different size from each other. For one example, the emission areas EA allocated with the red light emitting element R and the blue light emitting element B may have a first size, the emission area EA allocated with the green light emitting element G may have a second size smaller than the first size.

In addition, the shapes of the emission areas EA may have different shapes each other. For example, the emission area EA allocated with the red light emitting element R and the blue light emitting layer B may have polygonal shapes such as a rectangular shape, a rhombus shape or hexagonal shape. On the contrary, the emission area EA allocated with the green light emitting element G may have a circular shape. The pixel P including the red light emitting element R or the green light emitting element G may be defined as the rhombus shapes.

In addition, the red light emitting element R, the blue light emitting element B and the green light emitting element G may disposed as forming a triangular shape. For example, the unit pixel UP may have a '\/' shape or a '/\' shape.

In the above various examples, the emission area EA and the transmission area TA are arranged according to three different types. However, it is not limited thereto, and further various types may be applied.

Hereinafter, referring to figures, the light shutter panel LST will be explained in detail. The light shutter panels LST according to following examples may disposed on the rear side of the transparent display panels DIP explained above, for transpassing the lights and for blocking the lights incident from the rear side of the transparent display panel DIP, selectively.

First Embodiment

Figure 4A:
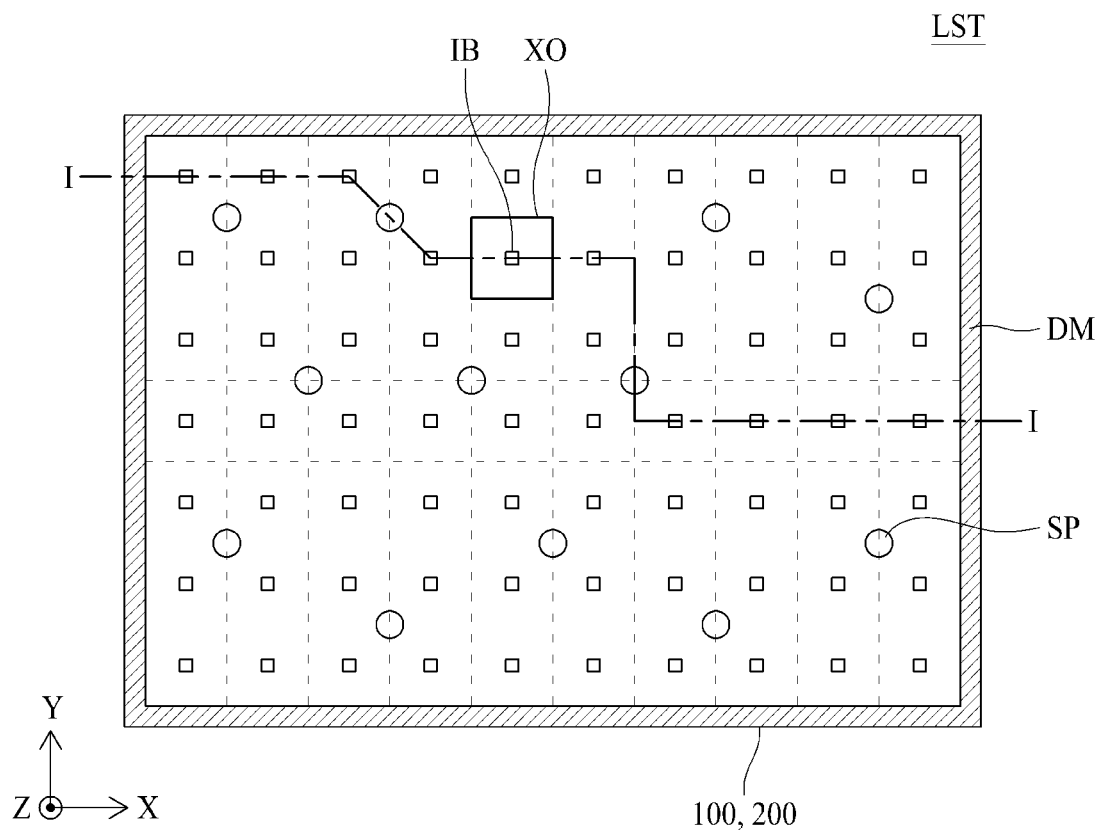
FIG. 4A is a plane view illustrating a structure of the light shutter panel according to the first embodiment of the present disclosure.
Figure 4B:
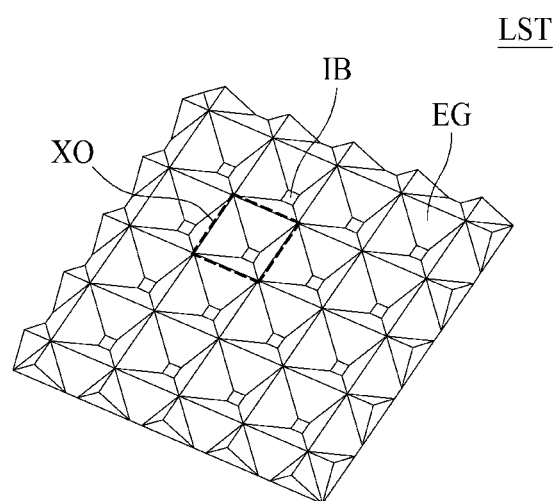
FIG. 4B is a perspective view illustrating a structure of the light shutter panel according to the first embodiment of the present disclosure.
Figure 5:
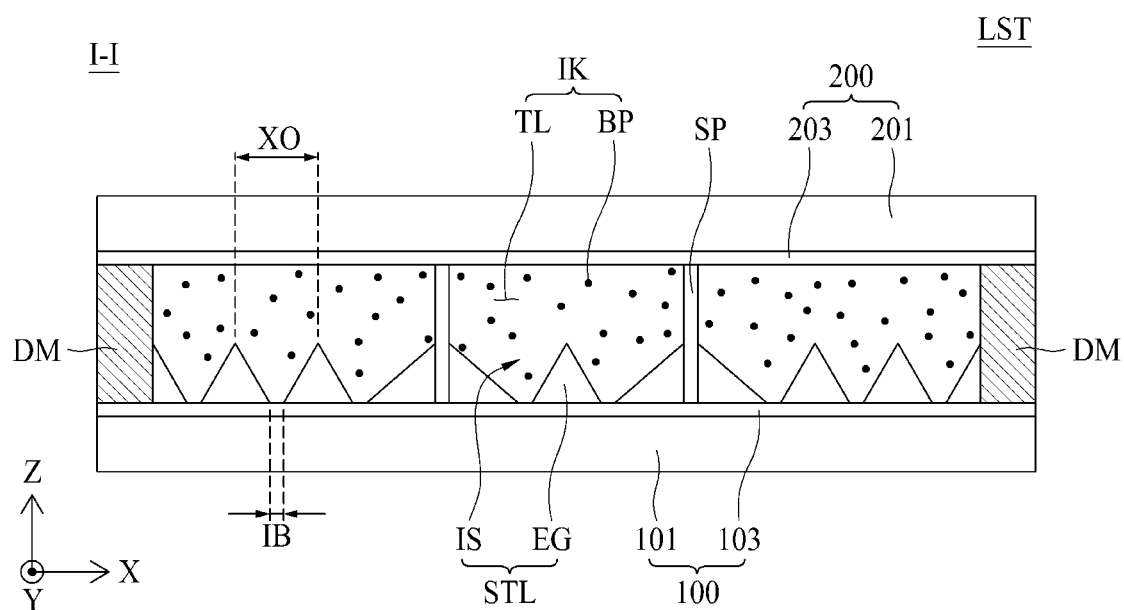
FIG. 5 is a cross-sectional view, along cutting line I-I in FIG. 4A, illustrating a structure of the light shutter panel according to the first embodiment of the present disclosure.

Hereinafter, referring to FIGS. 4A and 4B and FIG. 5, a light shutter panel LST according to the first embodiment of the present disclosure will be explained. FIG. 4A is a plane view illustrating a structure of the light shutter panel according to the first embodiment of the present disclosure. FIG. 4B is a perspective view illustrating a structure of the light shutter panel according to the first embodiment of the present disclosure. FIG. 5 is a cross-sectional view, along cutting line I-I in FIG. 4A, illustrating a structure of the light shutter panel according to the first embodiment of the present disclosure.

The light shutter panel LST according to the first embodiment of the present disclosure may include a lower electrode plate 100, an upper electrode plate 200, a shutter layer STL, a spacer SP and a black ink IK. The lower electrode plate 100 and the upper electrode plate 200 may be joined to be face each other with a predetermined interval. For example, the lower electrode plate 100 and the upper electrode plate 200 may be bonded to each other using a dam structure DM disposed at the circumference area of them.

The shutter layer STL may be disposed between the lower electrode plate 100 and the upper electrode plate 200. The shutter layer STL may include a maximum light transpassing portion XO, a minimum light blocking portion IB, an ink storage portion IS and an electric field guide EG. The ink storage portion IS may be a space formed between the maximum light transmitting portion XO and the minimum light blocking portion IB. A plurality of the ink storage portions IS may be arrayed in succession, the electric field guide EG may be disposed between the neighboring two ink storage portions IS. Accordingly, the electric field guide EG may be made of a transparent material as a structure connecting the maximum light transmitting portion XO and minimum light blocking portion IB. The ink storage portion IS may be defined as a space surrounded by the electric field guides EG.

A plurality of spacers SP are distributed between the lower electrode plate 100 and the upper electrode plate 200 for maintaining a constant gap between them. That is, the constant gap between the lower electrode plate 100 and the upper electrode plate 200 may be defined by the heights of the dam structure DM and the spacer SP. The light shutter panel LST may be an optical element for selectively being operated in the light blocking mode, or in the light transmitting mode. For an example, the light shutter panel LST according to the present disclosure may be applied to a transparent display apparatus in which the light transmittance ratio is considered as the most important factor in the light transmitting mode. In this case, it is preferable that the spacer SP may be formed of a transparent material. On the contrary, for another example, the light shutter panel LST according to the present disclosure may be applied to a transparent display apparatus in which the light blocking ratio is considered as the most important factor in the light blocking mode and the light transmittance ratio is not a significantly important factor. In that case, the spacer SP may be made of an opaque material.

The black ink IK may be filled in the ink storage portion IS of the shutter layer STL. The black ink IK may include a transparent fluid TL and a charged black particle BP dispersed into the transparent fluid TL. The transparent fluid TL may be an uncharged liquid such as pure water. The charged black particle BP may be charged with negative ion or positive ion, and evenly dispersed into the transparent fluid TL. By applying an electric field to the charge black ink IK, the distribution state of the charged black particle BP may be shifted so as to be concentrated to any one place. For example, the charged black particle BP may be an electrophoretic material.

For one example, in a state that an electric field is not applied, the charged black particles BP may be evenly distributed or dispersed in the ink storage portion IS, so that the entire area of the ink storage portion IS may be in a light blocking state. When an electric field is applied so as to concentrate the charged black particles BP into the minimum light blocking portion IB, the most area of the ink storage portion IS may be in the light transmitting state. Here, the transparent spacer SP and the charged black ink IK may be referred to the element included in the shutter layer STL.

The lower electrode plate 100 may include a lower transparent substrate 101 and a lower transparent electrode layer 103. The lower transparent substrate 101 may be a transparent substrate such as a glass or plastic substrate. In some cases, the lower transparent substrate 101 may be made in a film type having excellent flexibility. The lower transparent substrate 101 of the lower electrode plate 100 may have a rectangular plate structure including a first axis (or horizontal axis) X and a second axis (or vertical axis) Y.

The lower transparent electrode layer 103 may be deposited on the whole upper surface of the lower transparent substrate 101. The lower transparent electrode layer 103 may include a transparent conductive material such as indium-tin oxide (ITO), indium-zinc oxide (IZO) or indium-gallium-zinc oxide (IGZO). Even though it is not shown in the figures, a protective layer may be stacked on the entire upper surface of the lower transparent electrode layer 103.

The upper electrode plate 200 may have a shape and an area same as those of the lower electrode plate 100. The upper electrode plate 200 may include an upper transparent substrate 201 and an upper transparent electrode layer 203. The upper transparent substrate 201 of the upper electrode plate 200 may have a rectangular plate structure including a first axis (or horizontal axis) X and a second axis (or vertical axis) Y. The upper transparent electrode layer 203 may be deposited on the entire upper surface of the upper transparent substrate 201. The upper transparent electrode layer 203 may include a transparent conductive material. The lower electrode plate 100 and the upper electrode plate 200 may be joined with each other as the lower transparent substrate 101 and the upper transparent substrate 201 facing each other.

Hereinafter, the electric field guide EG and the ink storage portion IS will be explained in detail. The electric field guide EG may include a lower plane surface at the bottom part, and an apex side at the upper part. The lower plane surface may be disposed on the lower transparent electrode layer 103, and the upper part may be disposed toward the upper transparent electrode layer 203.

For an example, the electric field guide EG may have a triangular pillar shape. The one side surface of the triangular pillar shape may be disposed on the lower electrode plate 100. A plurality of triangular pillars is arrayed with a predetermined distance. In some cases, a plurality of triangular pillars is arrayed in a crossed structure disposed along the X axis and the Y axis. As the electric field guides EG having the triangular pillar shapes are disposed with a predetermined distance, the area exposed by the predetermined distance may be defined as the minimum light blocking portion IB. The upper area surrounded by the apex sides of the triangular pillars may be defined as the maximum light transmitting portion XO.

It is preferable that the apex sides of the electric field guide EG are apart from the upper transparent electrode layer 203 with a predetermined distance. It is preferable that the height of the electric field guide EG may correspond to 50% to 90% of the gap between the lower transparent electrode layer 103 and the upper transparent electrode layer 203. Further, the apex side may not have a sharply pointed shape but rather a rounded shape. It is preferable that the apex side may have a convex shape toward the upper direction, rather than a plane shape or a concaved shape.

A plurality of electric field guides EG are arrayed in a matrix manner with a predetermined distance. The ink storage portion IS may be defined by the volume excepting the electric field guide EG in the space between the lower electrode plate 100 and upper electrode plate 200. Accordingly, the minimum light blocking portion IB may be defined by the distance between the neighboring bottom surface of the electric field guides EG. Further, the maximum light transmitting portion XO may be defined by the distance between the neighboring apex sides of the electric field guides EG.

In one example, the ink storage portion IS may have a shape in which a square truncated cone is inverted. However, it is not restricted thereto, and it may have the shape of a truncated cone, or a polygonal truncated shape such as a hexagonal or octagonal pyramid. That is, the ink storage portion IS may have an inverted square truncated cone shape with the minimum light blocking portion IB as a bottom surface, the maximum light transmitting portion XO as an upper surface, and the electric field guide EG as an oblique surface.

In the case that the height of the electric field guide EG is smaller than the gap between the lower electrode plate 100 and the upper electrode plate 200, the space between the electric field guide EG and the upper electrode plate 200 may be also included in the ink storage portion IS. Therefore, the ink storage portion IS may have a profile in which the cross-sectional area is gradually increased from the minimum light blocking portion IB to the maximum light transmitting portion XO. Further, the electric field guide EG may have a profile in which the cross-sectional area is gradually decreased from the maximum light transmitting portion XO to the minimum light blocking portion IB.

It is preferable that the area of the minimum light blocking portion IB may be at most 30% of the area of the maximum light transmitting portion XO. In this case, as the light amount incident into the entire surface of the light shutter panel LST refers to 100%, the light amount transmitting the light shutter panel LST in the light transmitting mode may be ensured to be at least 70% of the incident light amount. That is, the area ratio of the minimum light blocking portion IB to the maximum light transmitting portion XO may be a major factor determining the light transmittance ratio of the light shutter panel LST.

Figure 6A:
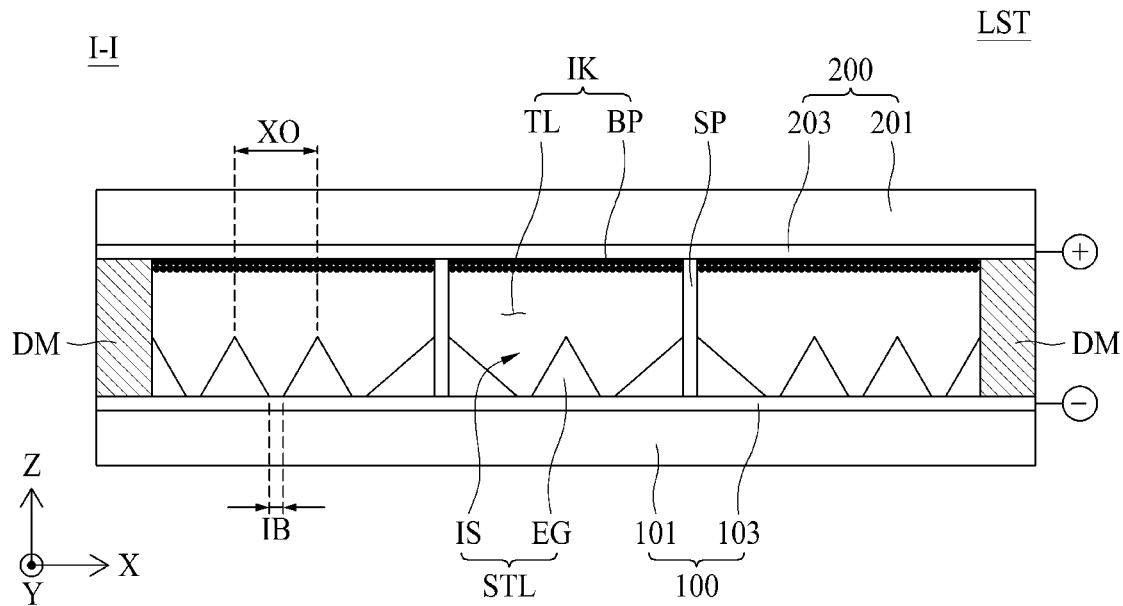
FIGS. 6A and 6B are cross-sectional views, along cutting line I-I in FIG. 4A, illustrating the operations of the light shutter panel according to the first embodiment of the present disclosure.
Figure 6B:
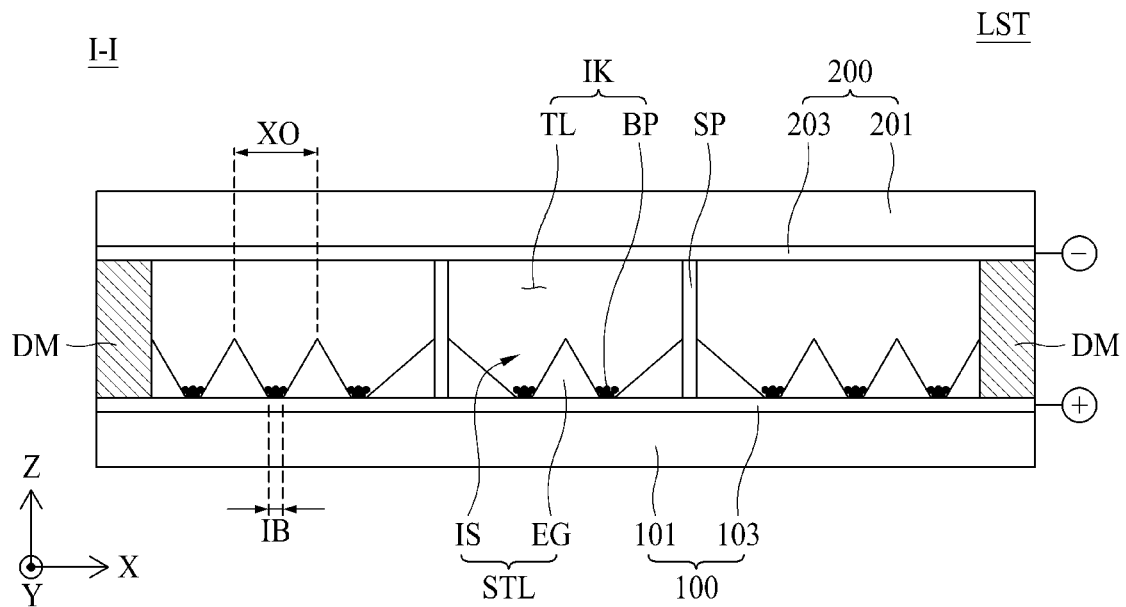

Hereinafter referring to FIG. 5 and FIGS. 6A and 6B, the operating mechanism of the light shutter panel LST according to the first embodiment of the present disclosure will be explained. FIG. 5 is a cross-sectional view, along cutting line I-I in FIG. 4A, illustrating a structure of the light shutter panel according to the first embodiment of the present disclosure. FIGS. 6A and 6B are cross-sectional views, along cutting line I-I in FIG. 4A, illustrating the operations of the light shutter panel according to the first embodiment of the present disclosure.

In the normal state as shown in FIG. 5, the charged black particles BP of the black ink IK may be charged with the negative ions, and they are evenly distributed within the transparent fluid. The normal state may refer to a state in which no voltage is applied to the lower transparent electrode layer 103 and the upper transparent electrode layer 203. In this state, as the charged black particles BP may be evenly distributed within the ink storage portion IS between the lower transparent electrode layer 103 and the upper transparent electrode layer 203, it may be in the light blocking mode. In some cases, as shown in FIG. 5, some of the light incident into the shutter layer STL may be scattered by the charged black particle BP evenly distributed within the ink storage portion IS, so a very little amount of the light may leak out of the upper transparent substrate 201.

Hereinafter, referring to FIG. 6A, the light blocking mode completely eliminating the little amount of leaked light will be explained. FIG. 6A is a cross-sectional view illustrating one example of the light blocking mode in the light shutter panel LST according to the first embodiment of the present disclosure. A negative common voltage may be applied to the lower transparent electrode layer 103 and a positive driving voltage may be applied to the upper transparent electrode layer 203, at the same time. Accordingly, the charged black particles BP having negative ions may move to the upper transparent substrate 201. The charged black particles BP may be evenly distributed to cover the entire surface of the upper transparent electrode layer 203, so the light shutter panel LST may be in the light blocking mode. Especially, since all of the charge black particles BP are disposed at the uppermost position of the ink storage portion IS, there is no scattered light. Therefore, the completely light blocking mode without any leakage light may be implemented.

FIG. 6B is a cross-sectional view illustrating a light transmitting mode of the light shutter panel LST according to the first embodiment of the present disclosure. Referring to FIG. 6A, the charged black particles BP of the black ink IK may be charged with the negative ions. A positive driving voltage may be applied to the lower transparent electrode layer 103, and a negative common voltage may be applied to the upper transparent electrode layer 203, at the same time. Accordingly, all of the charge black particles BP having the negative ions may move to the lower transparent electrode layer 103. Here, the charged black particles charged black particle BP are distributed only within the minimum light blocking portion IB due to the electric field guide EG. As a result, the minimum light blocking portion IB may be in the light blocking state, and other areas may be in the light transmitting state. In other words, the incident light from the outside of the lower electrode plate 100 may pass through the area of the maximum light transmitting portion XO except the minimum light blocking portion IB, and go out of the upper electrode plate 200.

Even though it is not shown in figures, the light shutter panel LST according to the first embodiment may further include a common terminal for receiving the common voltage, and a driving terminal for receiving the driving voltage. The common terminal and the driving terminal may be disposed outside of the light shutter panel LST and the driving signal may be supplied to these terminals from the external driver so the distribution state of the black ink IK may be controlled as explained above.

Second Embodiment

Figure 7:
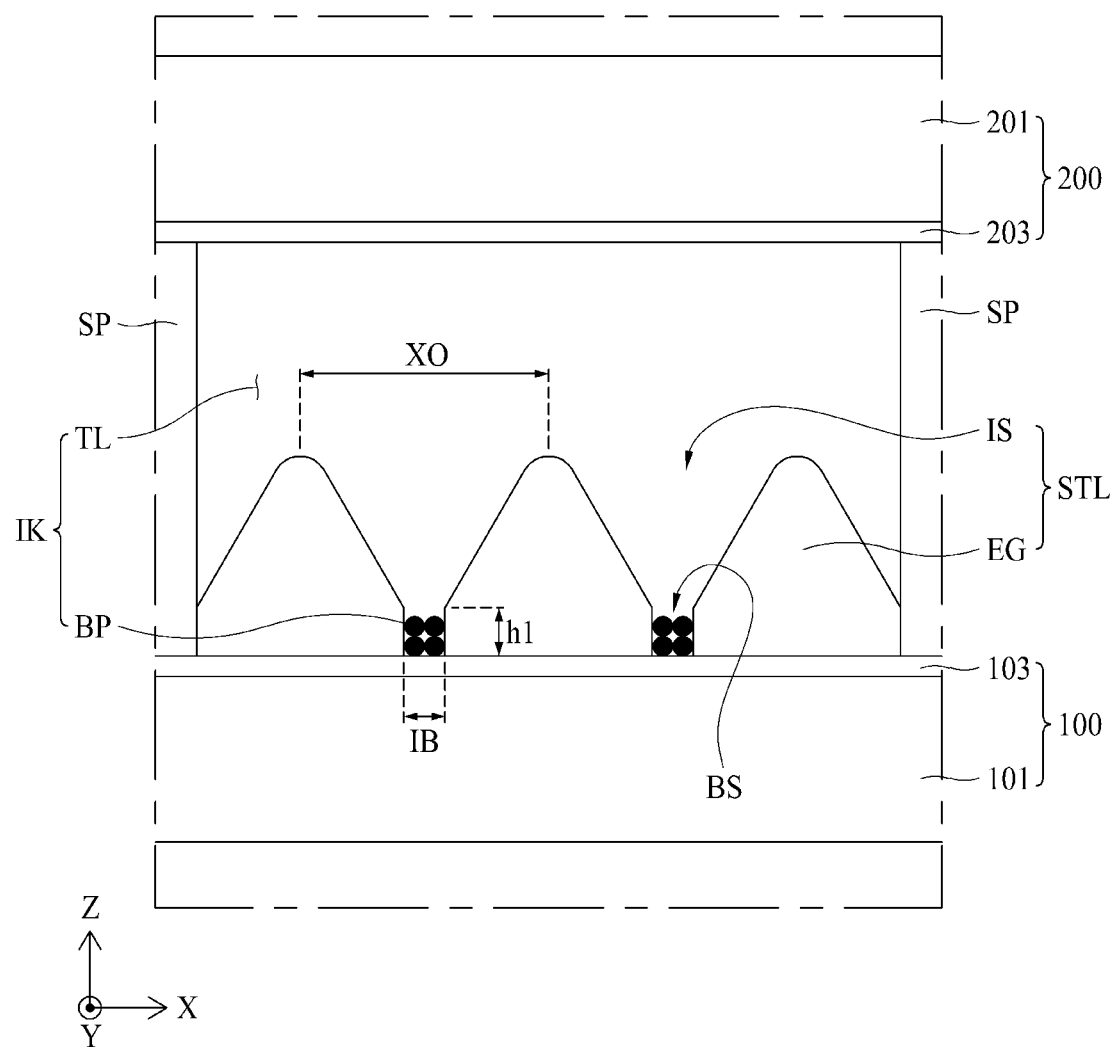
FIG. 7 is an enlarged cross-sectional view illustrating a structure of the light shutter panel according to the second embodiment of the present disclosure.

Hereinafter, referring to FIG. 7, a light shutter panel LST according to the second embodiment of the present disclosure will be explained. FIG. 7 is an enlarged cross-sectional view illustrating a structure of the light shutter panel according to the second embodiment of the present disclosure.

Referring to FIG. 7, the structure of the light shutter panel LST according to the second embodiment of the present disclosure may be very similar to that of the first embodiment. The different point is that the light shutter panel LST according to the second embodiment may further include a black particle storage portion BS. The black particle storage portion BS may be defined as the space in which the minimum light blocking portion IB extends from the bottom surface of the electric field guide EG to a certain height h1. Here, in the light transmitting mode, all of the charged black particles BP may be concentrated into the black particle storage portions BS. The black particle storage portion BS may have the cross-sectional area same as the area of the minimum light blocking portion IB regardless of the height, so that the maximum transmittance ratio may be ensured.

The top of the electric field guide EG may have a round tip structure in which the middle portion has the highest height and sloped side to downward direction, so all of the charge black particles BP may be smoothly moved into the black particle storage portion BS. When the top of the electric field guide EG may have a plane surface or a concaved surface, some of the charged black particles BP may remain on the top of the electric field guide EG. Therefore, the transmittance ratio may be degraded. It is preferable that the top of the electric field guide EG may have a convex rounded tip shape.

Third Embodiment

Figure 8A:
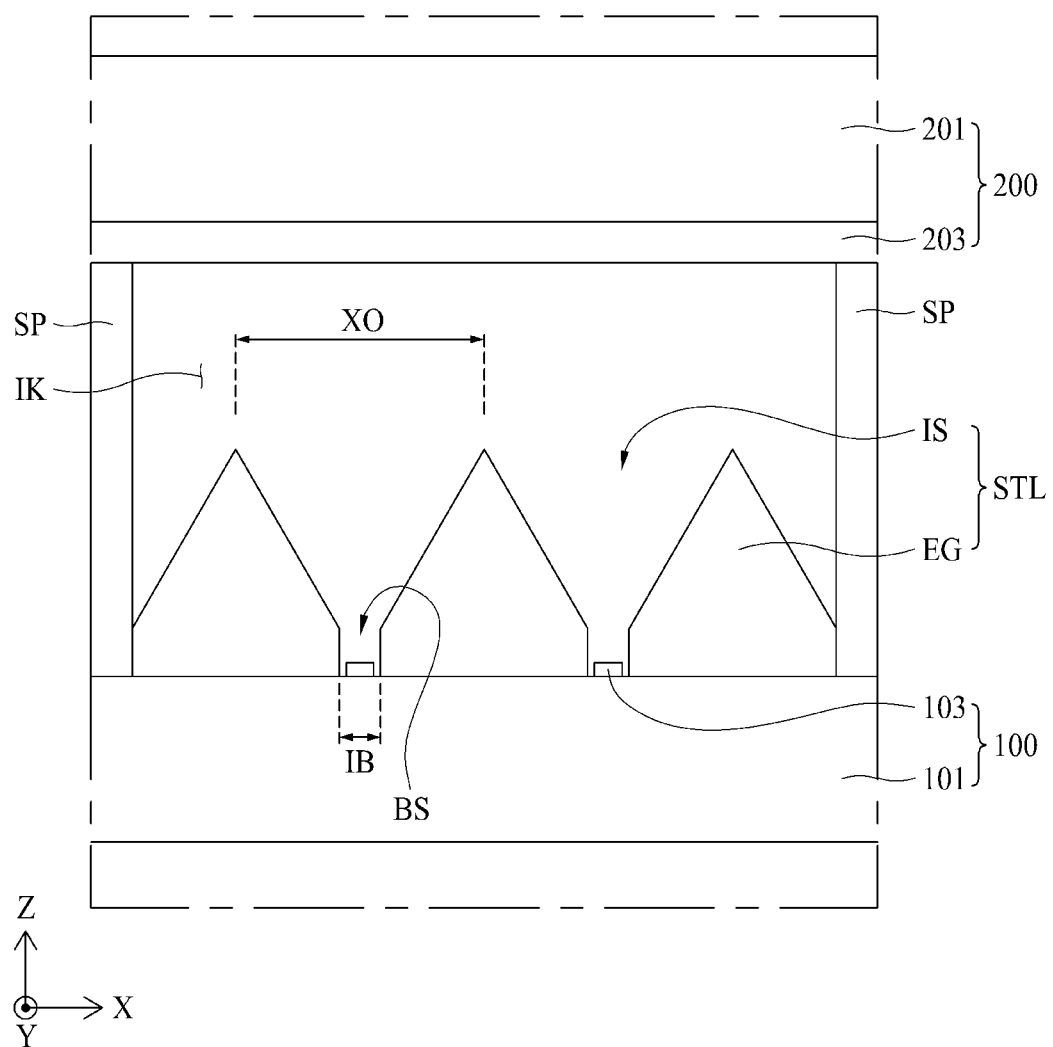
FIGS. 8A and 8B are enlarged cross-sectional views illustrating various structures of the light shutter panel according to the third embodiment of the present disclosure.
Figure 8B:
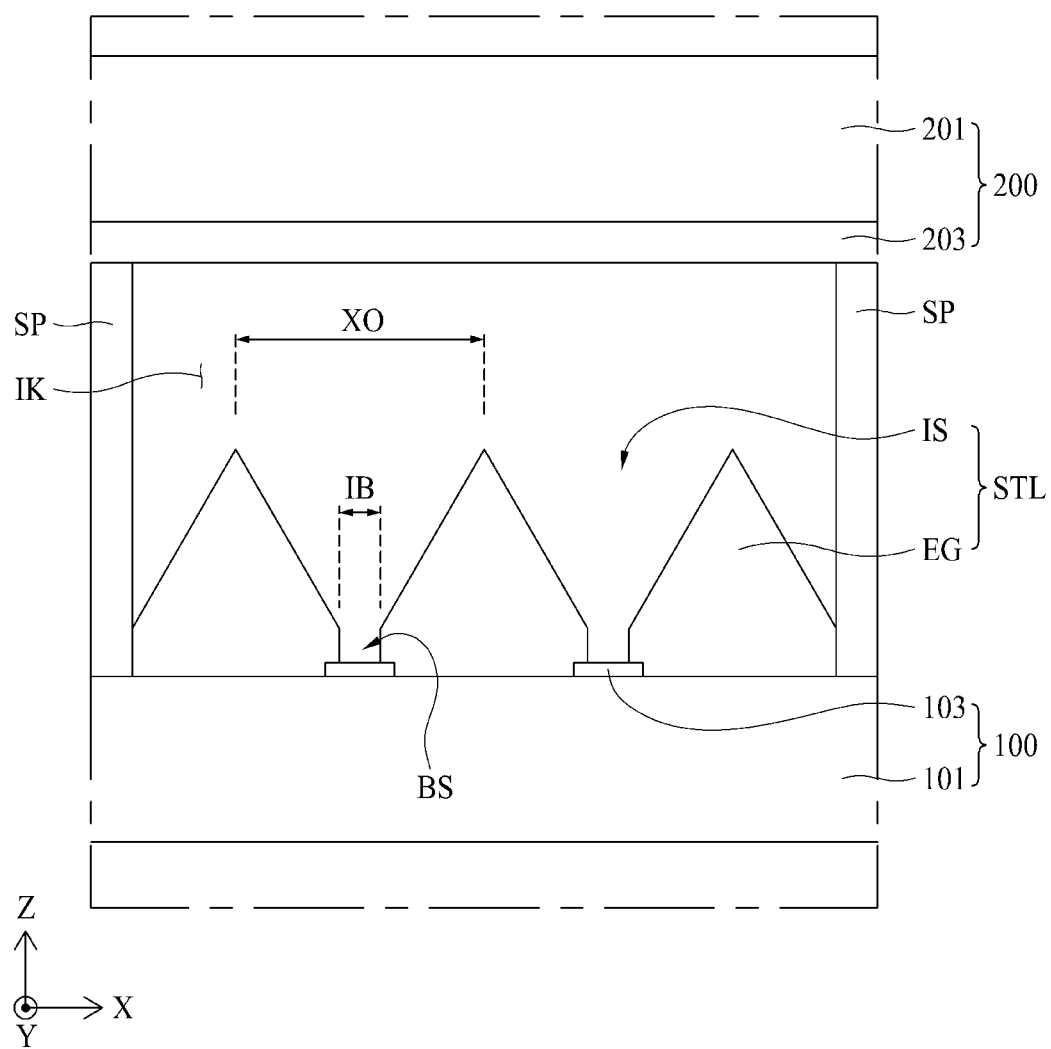

Hereinafter, referring to FIGS. 8A and 8B, the light shutter panel LST according to the third embodiment of the present disclosure will be explained. FIGS. 8A and 8B are enlarged cross-sectional views illustrating various structures of the light shutter panel according to the third embodiment of the present disclosure.

The structure of the light shutter panel LST according to the third embodiment of the present disclosure may be very similar to that of the first embodiment. The difference is that the lower transparent electrode layer 103 is not deposited on the entire surface of the lower transparent substrate 101, but is patterned on the upper surface of the lower transparent substrate 101. In particular, the lower transparent electrode layer 103 may be patterned as disposed within the minimum light blocking portion IB on the upper surface of the lower transparent substrate 101.

FIG. 8A shows one case in which the lower transparent electrode layer 103 has smaller area than the minimum light blocking portion IB and is disposed within the minimum light blocking portion IB. FIG. 8B shows another case in which the lower transparent electrode layer 103 has slightly larger area than the minimum light blocking portion IB and the most middle area of the lower transparent electrode layer 103 is exposed by the minimum light blocking portion IB.

The minimum light blocking portion IB may be a portion to have a minimum area where the charge black particles BP are gathered to block light, in a light transmitting mode. The minimum light blocking portion IB is the area for blocking light in the light transmitting mode, as well as in the light blocking mode. Accordingly, when the lower transparent electrode layer 103 is patterned as corresponding to the minimum light blocking portion IB as in the third embodiment, the lower transparent electrode layer 103 may be made of an opaque metal material.

Fourth Embodiment

Figure 9A:
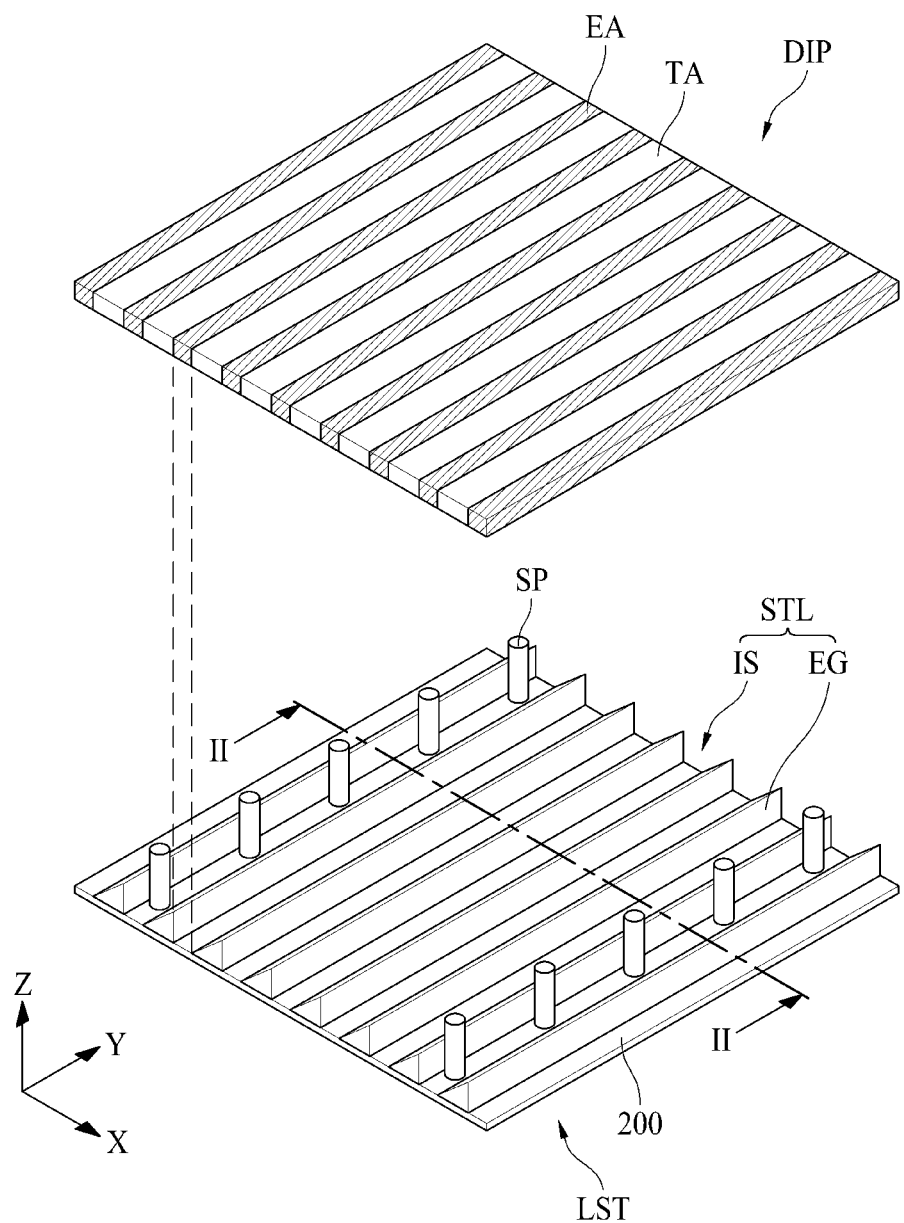
FIG. 9A is a perspective view illustrating a transparent display apparatus according to the fourth embodiment of the present disclosure.
Figure 9B:
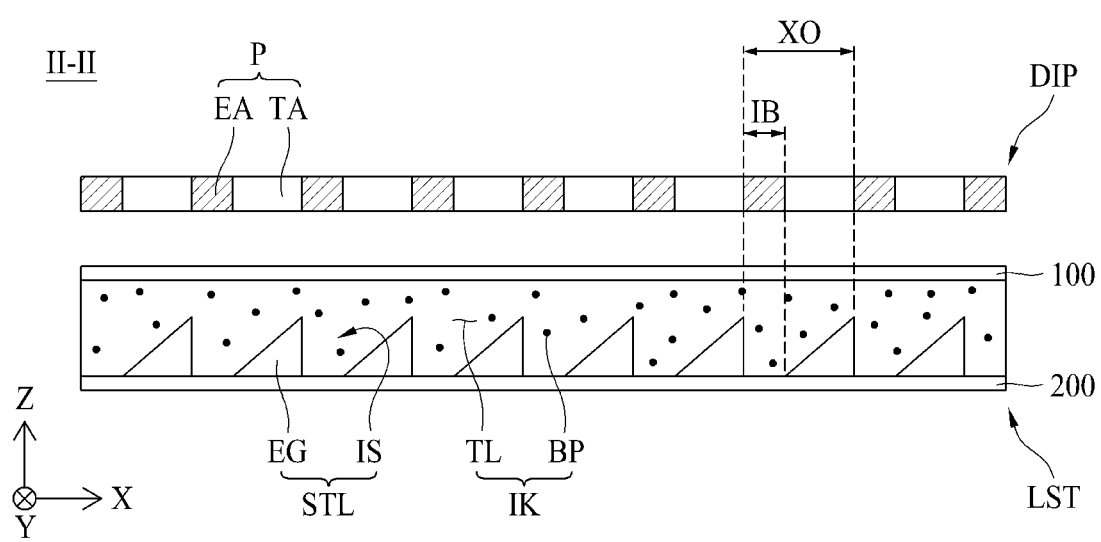
FIG. 9B is a cross-sectional view, along cutting line II-II in FIG. 9A, illustrating a structure of the transparent display apparatus according to the fourth embodiment of the present disclosure.

Hereinafter, detailed examples for configuring the transparent display apparatus will be explained. The description will focus on the correlation between the pixel arrangement structure of the transparent display panel and the arrangement structure of the electric field guide of the light shutter panel. First, referring to FIGS. 9A and 9B, a transparent display apparatus according to the fourth embodiment of the present disclosure will explained. FIG. 9A is a perspective view illustrating a transparent display apparatus according to the fourth embodiment of the present disclosure. FIG. 9B is a cross-sectional view, along cutting line II-II in FIG. 9A, illustrating a structure of the transparent display apparatus according to the fourth embodiment of the present disclosure.

Referring to FIGS. 9A and 9B, the transparent display apparatus may comprise a transparent display panel DIP and a light shutter panel LST disposed on the rear side of the transparent display panel DIP. Here, the rear side refers to an opposite side of the front side where the video information is provided from the transparent display panel DIP. Otherwise, the rear side refers to a side where the light from the background is incident, in the transparent display apparatus.

FIG. 9A illustrates a transparent display panel DIP only having a plurality of emission areas EA and a plurality of transmission areas TA, but the non-emission areas BM are not shown, for convenience of explanation. In addition, FIG. 9A illustrates the light shutter panel LST briefly for convenience of explanation. For showing the internal structure in detail, the upper electrode plate 200 is not shown in FIG. 9A. However, elements required for explanation but not shown in FIG. 9A may be shown in FIG. 9B. The explanations about the elements not shown in FIGS. 9A and 9B, because they are not necessary in the explanation about the structure, may be referred to the embodiments explained above.

The transparent display panel DIP according to the fourth embodiment of the present disclosure may have the pixel arrangement structure as shown in FIG. 3B. For example, a plurality of emission areas EA may have a vertical striped shape as arranged in succession along the Y axis, and may be arrayed along the X axis with a predetermined distance. The transmission area TA may be disposed on the lateral side (along the X axis) of the emission area EA. That is, the transmission areas TA may have the vertical stripped shape and may be arrayed along the horizontal direction (X axis) with a predetermined distance.

The light shutter panel LST according to the fourth embodiment of the present disclosure includes a lower electrode plate 100, a upper electrode plate 200, a maximum light transmitting portion XO, a minimum light blocking portion IB and an ink storage portion IS, an electric field guide EG, a spacer SP and black ink IK. In the following description, the maximum light transmitting portion XO, the minimum light blocking portion IB, the ink storage portion IS and the electric field guide EG configuring the shutter layer STL will be explained mainly.

The minimum light blocking portion IB of the shutter layer STL according to the fourth embodiment may have a size and shape corresponding to the emission area EA of the transparent display panel DIP. For example, the minimum light blocking portion IB may have a stripped shape along the vertical direction (Y axis), and be disposed along the horizontal direction (X axis) with a predetermined distance. Each of the minimum light blocking portion IB may be disposed in one-to-one correspondence with each of the emission areas EA, respectively.

The maximum light transmitting portion XO may have a size and a shape corresponding to the size and shape of the pixel P including the emission area EA and the transmission area TA. For example, as the pixel P may have a stripped shape along the vertical direction (Y axis), the maximum light transmitting portion XO may have the stripped shape corresponding to the shape of the pixel P and be disposed along the horizontal direction (X axis).

By the arrangement characteristics of the minimum light blocking portion IB and maximum light transmitting portion XO, the electric field guide EG may have the shape of a right-angled triangular pillar. In particular, the base surface may be disposed on the top surface of the lower electrode plate 100, and the apex side may face the upper electrode plate 200. The sloped surface may be defined as a surface connecting one side of the minimum light blocking portion IB and one side of the maximum light transmitting portion XO. In other word, the cross-sectional view on the XZ plane of the electric field guide EG may have a structure in which a plurality of the right triangles are arrayed with a predetermined distance corresponding to the emission area EA.

For another viewpoint, the ink storage portion IS may have a shape of a long-inverted frustum of quadrangular pyramid. The ink storage portion IS may be the frustum of quadrangular pyramid with an asymmetric structure of which cross-sectional shape may be an inverse right-angle trapezoid. For example, the base surface of the ink storage portion IS may correspond to the minimum light blocking portion IB, and the upper surface of the ink storage portion IS may correspond to the maximum light transmitting portion XO. The base surface may be parallel with the upper surface, and the upper surface may be shifted to at one side of the upper surface. The shutter layer STL according to the fourth embodiment of the present disclosure may have a structure in which the center point of the minimum light blocking portion IB may not coincide with the center of the maximum light transmitting portion XO, but be biased to any one side.

The spacer SP may include a transparent material or an opaque material. When the spacer SP is made of the transparent material, a light leakage may occur by the spacer SP in the light blocking mode so that the light blocking ratio may be degraded. When the spacer SP is made of the opaque material, the space SP may block the light in the light transmitting mode so that the light transmittance ratio may be degraded. In order to solve these problems, the spacer SP according to the fourth embodiment may be disposed at the positions corresponding to the emission areas EA which do not transmit the background light at all times. For example, a plurality of spacers SP may be disposed with a predetermined distance within the area overlapped with the minimum light blocking portion IB.

In one example, a plurality of spacers SP having the cylindrical shape may be disposed with a predetermined distance along the minimum light blocking portion IB. It is preferable that the spacers SP are disposed corresponding to the emission area EA that is a portion of the transparent display panel DIP excluding the transmission area TA and/or the non-emission area BM so as not to affect the light blocking ratio and the light transmittance ratio. As the spacers SP are for maintaining the gap between the lower electrode plate 100 and upper electrode plate 200, they may have the same height with the dam structure. Further, the spacer SP may have the height higher than that of the electric field guide EG.

In the above explanation, one of the maximum light transmitting portions XO is arranged as corresponding to one column of pixels P. However, it is not limited thereto, and one of the maximum light transmitting portion XO may be arranged as covering a plurality columns of pixels P. For an example, one of the minimum light blocking portion IB may be arranged as corresponding to any one column of the emission area EA, and one of the maximum light transmitting portion XO may be arranged as covering two columns of pixels P continuous in the direction of any one side (i.e., the left side) of the emission area EA.

The operation modes including the light transmitting mode and the light blocking mode for the transparent display apparatus according to the fourth embodiment of the present disclosure may be similar with the explanations described with FIGS. 6A and 6B.

Fifth Embodiment

Figure 10A:
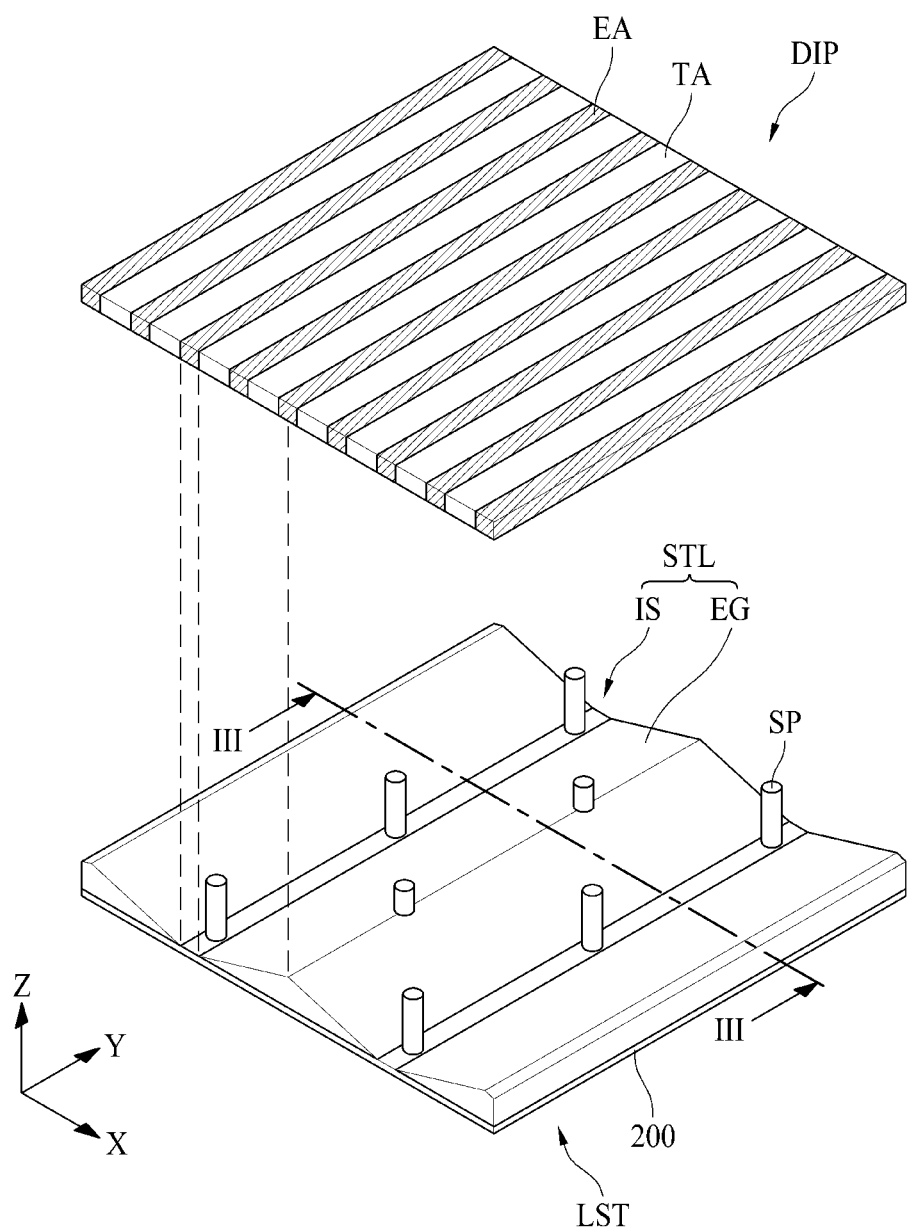
FIG. 10A is a perspective view illustrating a transparent display apparatus according to the fifth embodiment of the present disclosure.
Figure 10B:
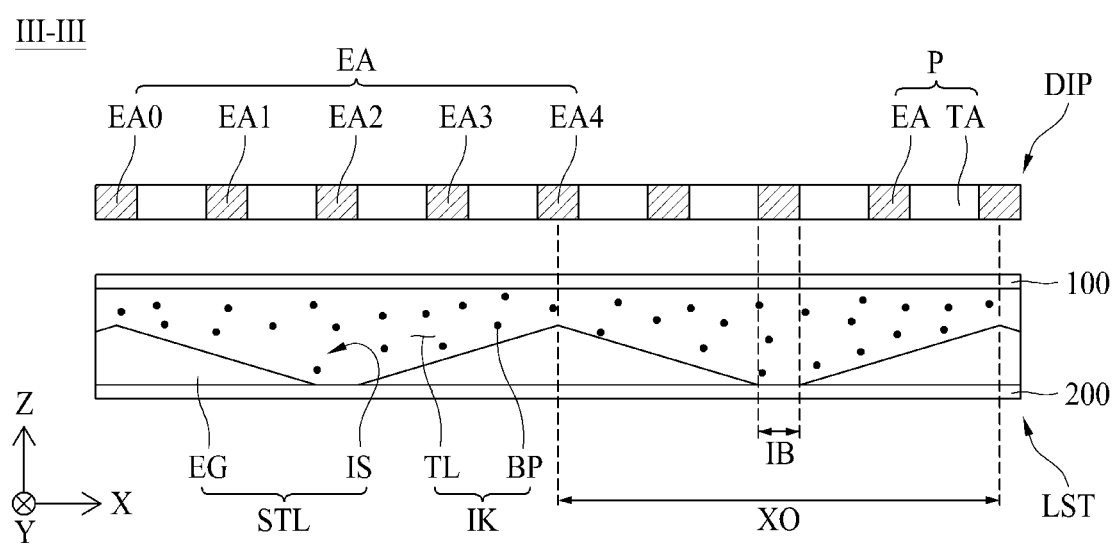
FIG. 10B is a cross-sectional view, along cutting line in FIG. 10A, illustrating a structure of the transparent display apparatus according to the fifth embodiment of the present disclosure.

Hereinafter referring to FIGS. 10A and 10B, the fifth embodiment of the present disclosure will be explained. FIG. 10A is a perspective view illustrating a transparent display apparatus according to the fifth embodiment of the present disclosure. FIG. 10B is a cross-sectional view, along cutting line in FIG. 10A, illustrating a structure of the transparent display apparatus according to the fifth embodiment of the present disclosure.

In the fifth embodiment, various structures of the light shutter panel will be explained. The structure of the light shutter panel may be implemented in various ways according to the pixel array structure of the transparent display panel disposed thereon. Therefore, the optical shutter panels may be variously configured for the same transparent display panel. Hereinafter, various light shutter panels having different structures applicable to the same transparent display panel explained in the fourth embodiment will be explained.

The transparent display panel DIP according to the fifth embodiment of the present disclosure, as shown in FIG. 3B, may include a plurality of the emission areas EA and a plurality of the transmission areas TA having vertical stripped shapes, and being arrayed along the horizontal direction (X axis). Especially, each of the emission areas EA and each of the transmission areas TA is alternately arrayed.

The light shutter panel LST according to the fifth embodiment may include a lower electrode plate 100, an upper electrode plate 200, a maximum light transmitting portion XO, a minimum light blocking portion IB, an ink storage portion IS, an electric field guide EG, a spacer SP and a black ink IK. The minimum light blocking portion IB of the shutter layer STL may have a size and a shape corresponding to those of the emission area EA in any column disposed in the transparent display panel DIP. Each of the minimum light blocking portion IB may have a stripped shape corresponding to each of the emission area EA in a one-to-one relationship, and may be arrayed with a predetermined distance along the horizontal direction (X axis). For another example, the minimum light blocking portion IB may be disposed as covering each of the three consecutively adjacent emission areas EA. For still another example, the maximum light transmitting portion XO may have a size and a shape corresponding to all the areas of the transmission areas TA of two columns which are located at one side and the other side, respectively, along the X axis based on the emission area EA corresponding to the minimum light blocking portion IB.

In one example, the minimum light blocking portion IB may be disposed as corresponding to the second emission area EA2 disposed at the middle portion among the three emission areas EA1, EA2 and EA3 which are consecutively adjacent along the X axis. In addition, the maximum light transmitting portion XO may be disposed as covering all areas from the middle portion of the 0th emission area EA0 placed at next second position to −X axis direction based on the second emission area EA2 to the middle portion of the 4th emission area EA4 placed at next second position to X axis direction based on the second emission area EA2.

By the arrangement features of the minimum light blocking portion IB and maximum light transmitting portion XO, the electric field guide EG may have an isosceles triangular pillar shape. The base surface may be disposed on the top surface of the lower electrode plate 100, the apex side may face the upper electrode plate 200. The slope surfaces may be defined as the surfaces connecting one side of the minimum light blocking portion IB and one side of the maximum light transmitting portion XO. In other word, the cross-sectional view on the XZ plane of the electric field guide EG may have a structure in which a plurality of the isosceles triangles is arrayed with a predetermined distance corresponding to the emission area EA or corresponding to the minimum light blocking portion IB.

The apex side of the electric field guide EG may be disposed as facing the middle portion of the any one emission area EA. The predetermined distance between two neighboring electric field guides may be disposed as corresponding to another emission area EA.

In addition, the ink storage portion IS may have a shape of the inverted square frustum. Especially, the ink storage portion IS may have an inverted square truncated cone shape with a symmetrical structure in lateral direction. For example, the base surface of the ink storage portion IS may correspond to the minimum light blocking portion IB, and the upper surface may correspond to the maximum light transmitting portion XO. The base surface may be parallel with the upper surface, and be disposed as corresponding to the middle portion of the upper surface. The shutter layer STL may have a structure in which the center point of the maximum light transmitting portion XO may coincide with the center point of the minimum light blocking portion IB.

The spacer SP may include a transparent material or an opaque material. Like the fourth embodiment of the present disclosure, in order to prevent light leakage and to ensure light blocking ratio perfectly, the spacer SP may be disposed at the positions corresponding to the emission areas EA which do not transmit the background light at all times. For example, a plurality of spacers SP may be disposed with a predetermined distance within the area overlapped with the minimum light blocking portion IB.

In another example, the light shutter panel LST according to the fifth embodiment of the present disclosure may include a plurality of spacers SP disposed on the apex side of the electric field guide EG. In the fifth embodiment, as the apex side of the electric field guide EG is disposed as overlapping with the middle portion of the emission area EA, the spacers SP may be disposed at the apex side of the electric field guide EG for preventing the light leakage and ensuring the light blocking ratio, perfectly. It is preferable that the spacers SP may be disposed at the area except the transmission area TA in the transparent display panel DIP so as not to adversely affect the light blocking ratio and the light transmittance ratio. In FIG. 10A, the spacers SP are disposed at the apex side of the electric field guide EG and the minimum light blocking portion IB.

In the embodiments explained above, for the transparent display apparatus according to the present disclosure, the light shutter panel may have the structure suitable for applying to the transparent display panel in which the emission areas and the transmission areas are disposed as stripped shapes. However, the features of the light shutter panel according to the present disclosure may be applied to the transparent display panel having the structures as shown FIG. 3A or FIG. 3C.

According to the fourth and fifth embodiments of the present disclosure, the light shutter panel may comprise a plurality of maximum light transmitting portions XO arrayed in a matrix. One of the maximum light transmitting portion XO may include one of the minimum light blocking portion IB. Each of the maximum light transmitting portion XO may be connected to each of the minimum light blocking portions IB. By this connection structure, the ink storage portion IS and the electric field guide EG may be defined and formed.

Here, the electric field guide EG may be a structural element to avoid the distortion when the electric field is formed to the ink storage portion IS. Further, the electric field guide EG may be a structural element for preventing any distortion from being occurred when switching the distribution state of the charged black particles from the maximum diffusion state and the minimum diffusion state. Therefore, the electric field guide EG may be referred to as a 'guide for charged black particle' or a 'light blocking guide'.

The transparent display apparatus according to the present disclosure may provide the video information with the background scene, or provide the video information only as blocking the background scene, selectively. Since the minimum light blocking portion IB of the light shutter panel LST is disposed as overlapping with the emission area EA of the transparent display panel DIP, the maximum light transmittance ratio may be ensured. Further, as the spacers SP maintaining the thickness of light shutter panel LST uniformly are disposed within the emission area EA, the maximum light transmittance ratio may be ensured and the perfect light blocking ratio may be guaranteed.

The light shutter panel LST according to the fourth and fifth embodiment of the present disclosure may comprise an electric field guide EG and an ink storage portion IS arranged in association with the pixel array structure of the transparent display panel DIP. In the view point of manufacturing process, the light shutter panel LST may be applied to the transparent display panel DIP having low resolution less than 200 dpi (dots per inch), considering the correlation between the manufacturing cost and the quality of the transparent display apparatus. With the low-resolution specification, as the densities of the transmission area and the emission area are low, the transmittance ratio may be degraded by the minimum light blocking portion IB of the light shutter panel LST. In order to solve this degradation, it is preferable that the minimum light blocking portion IB of the light shutter panel LST may be disposed as overlapping with or corresponding to the emission area EA of the transparent display panel DIP. However, it is not limited thereto, the light shutter panel LST may be applied to the transparent display panel DIP having a high-resolution specification over 200 dpi.

Features, structures, effects and so on described in the above described examples of the present disclosure are included in at least one example of the present disclosure, and are not necessarily limited to only one example. Furthermore, features, structures, effects and so on exemplified in at least one example of the present disclosure may be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A light shutter panel comprising:
   a lower electrode plate;
   an upper electrode plate facing the lower electrode plate;
   a shutter layer disposed between the lower electrode plate and the upper electrode plate, and including maximum light transmitting portions, minimum light blocking portions, ink storage portions connecting the maximum light transmitting portions and the minimum light blocking portions, and an electric field guide disposed between the ink storage portions, the ink storage portions including a first ink storage portion and a second ink storage portion that is adjacent to the first ink storage portion without another ink storage portion from the ink storage portions between the first ink storage portion and the second ink storage portion;
   a plurality of spacers maintaining a gap between the lower electrode plate and the upper electrode plate; and
   black ink filled into the ink storage portions of the shutter layer,
   wherein a height of the electric field guide is smaller than the gap between the lower electrode plate and the upper electrode plate,
   wherein the light shutter panel is configured to operate in a light blocking mode that blocks light incident on the light shutter panel responsive to a first common voltage applied to the upper electrode plate and a second common voltage applied to the lower electrode plate that is different from the first common voltage, wherein black ink in the first ink storage portion and black ink in the second ink storage portion are on the upper electrode plate during the light blocking mode to block the incident light, and wherein the light shutter panel is configured to operate in a light transmitting mode that allows the light incident on the light shutter panel to pass through a maximum light transmitting portion of the first ink storage portion and a maximum light transmitting portion of the second ink storage portion responsive to the second common voltage applied to the upper electrode plate and the first common voltage applied to the lower electrode plate, wherein the black ink in the first ink storage portion is on the lower electrode plate within a minimum light blocking portion of the first ink storage portion and the black ink in the second ink storage portion is on the lower electrode plate within a minimum light blocking portion of the second ink storage portion during the light transmitting mode to allow the incident light to pass through the maximum light transmitting portion of the first ink storage portion and through the maximum light transmitting portion of the second ink storage portion.

2. The light shutter panel according to claim 1, wherein the lower electrode plate includes:
a lower transparent substrate; and
a lower transparent electrode layer disposed on an entire upper surface of the lower transparent substrate,
wherein the upper electrode plate includes:
an upper transparent substrate; and
an upper transparent electrode layer disposed on the entire upper surface of the upper transparent substrate, and
wherein the lower electrode plate and the upper electrode plate are joined with each other to face the lower transparent electrode layer and the upper transparent electrode layer.

3. The light shutter panel according to claim 1, wherein each of the ink storage portions has a profile in which a cross sectional shape of the ink storage portion extends from the minimum light blocking portion to the maximum light transmitting portion, and a cross sectional area of the ink storage portion increases gradually,
wherein the electric field guide extends from the maximum light transmitting portion to the minimum light blocking portion, and a cross sectional area of the electric field guide decreases gradually.

4. The light shutter panel according to claim 1, wherein an area of the minimum light blocking portions is at most 30% of an area of the maximum light transmitting portions.

5. The light shutter panel according to claim 1, wherein the height of the electric field guide is in a range of 50% to 90% of a height of the plurality of spacers.

6. The light shutter panel according to claim 1, wherein the black ink includes:
a transparent fluid; and
a plurality of charge black particles evenly dispersed into the transparent fluid.

7. The light shutter panel according to claim 1, wherein a center point of a minimum light blocking portion from the minimum light blocking portions is arranged to coincide with a center point of a maximum light transmitting portion from the maximum light transmitting portions.

8. The light shutter panel according to claim 1, wherein a center point of a minimum light blocking portion from the minimum light blocking portions is arranged shift to one side of a maximum light transmitting portion from the maximum light transmitting portions.

9. A transparent display apparatus comprising:
a transparent display panel including a plurality of pixels in a matrix, each of the plurality of pixels including an emission area and a transmission area; and
a light shutter panel attached to a rear surface of the transparent display panel, the light shutter panel including:
a lower electrode plate;
an upper electrode plate facing the lower electrode plate;
a shutter layer disposed between the lower electrode plate and the upper electrode plate, and including a maximum light transmitting portion, a minimum light blocking portion, ink storage portions connecting the maximum light transmitting portion and the minimum light blocking portion, and an electric field guide disposed between the ink storage portions;
a plurality of spacers maintaining a gap between the lower electrode plate and the upper electrode plate; and
black ink filled into the ink storage portions of the shutter layer,
wherein a height of the electric field guide is smaller than the gap between the lower electrode plate and the upper electrode plate.

10. The transparent display apparatus according to claim 9, wherein the maximum light transmitting portion of the light shutter panel is arranged to correspond to at least one pixel of the plurality of pixels of the transparent display panel.

11. The transparent display apparatus according to claim 10, wherein the minimum light blocking portion of the light shutter panel is arranged to correspond to the emission area of the at least one pixel corresponding to the maximum light transmitting portion.

12. The transparent display apparatus according to claim 9, wherein the plurality of spacers of the light shutter panel are arranged to correspond to areas except the transmission area of the transparent display panel.

13. The transparent display apparatus according to claim 12, wherein the plurality of spacers are arrayed to overlap with the minimum light blocking portion with a predetermined distance.

14. The transparent display apparatus according to claim 12, wherein the plurality of spacers are arrayed on the electric field guide with a predetermined distance.

15. The transparent display apparatus according to claim 9, wherein the lower electrode plate includes:
a lower transparent substrate; and
a lower transparent electrode layer disposed on an entire upper surface of the lower transparent substrate,
wherein the upper electrode plate includes:
an upper transparent substrate; and
an upper transparent electrode layer disposed on the entire upper surface of the upper transparent substrate, and
wherein the lower electrode plate and the upper electrode plate are joined with each other to face the lower transparent electrode layer and the upper transparent electrode layer.

16. The transparent display apparatus according to claim 9, wherein each of the ink storage portions has a profile in which a cross sectional shape of the ink storage portion extends from the minimum light blocking portion to the maximum light transmitting portion, and a cross sectional area of the ink storage portion increases gradually, wherein the electric field guide extends from the maximum light transmitting portion to the minimum light blocking portion, and a cross sectional area of the electric field guide decreases gradually.

17. The transparent display apparatus according to claim 9, wherein an area of the minimum light blocking portion is at most 30% of an area of the maximum light transmitting portion.

18. The transparent display apparatus according to claim 9, wherein the black ink includes:
    a transparent fluid; and
    a plurality of charge black particles evenly dispersed into the transparent fluid.

19. The transparent display apparatus according to claim 9, wherein a center point of the minimum light blocking portion is arranged to coincide with a center point of the maximum light transmitting portion.

20. The transparent display apparatus according to claim 9, wherein a center point of the minimum light blocking portion is arranged to shift to one side of the maximum light transmitting portion.

* * * * *